Patented May 7, 1940

2,199,774

UNITED STATES PATENT OFFICE 2,199,774

DEHYDROHALOGENATION OF ALPHA-CHLOROISOBUTYRIC ESTERS WITH ZINC AND ZINC HALIDES

Harold J. Barrett, Niagara Falls, N. Y., assignor to E. I. du Pont de Nemours & Company, Wilmington, Del., a corporation of Delaware No Drawing. Application April 3, 1937, Serial No. 134,740

10 Claims. (Cl. 260—486)

This invention relates to a process for the production of alpha, beta-unsaturated acid esters. More particularly it relates to a process for the production of methacrylic acid esters by treatment of alpha-halogenated isobutyric acid esters with zinc.

An object of this invention is to provide a process for the preparation of alpha-substituted acrylic acid esters by a new and economical process. A further object of the invention is to provide a process for the preparation of alpha beta-unsaturated acid esters by the dehydrohalogenation of an alpha-hydrocarbon alpha-halogenated propionic acid ester. Other objects and advantages of the invention will hereinafter appear.

These and other objects are accomplished by heating an ester of an alpha-hydrocarbon alpha-halogenated propionic acid with zinc and fractionating the reaction product to isolate the alpha beta-unsaturated acid ester or esters and recover unchanged, alpha-hydrocarbon alpha-halogenated propionic acid ester.

According to the invention an ester such as, for example, the methyl ester of alpha-chloroisobutyric acid is heated with zinc under a distilling column with a reflux so adjusted that the methyl methacrylate, along with hydrochloric acid, is removed from the reaction mixture as formed while the unreacted chlorester is returned to the reaction vessel. The resulting distillate is treated with an alkaline substance such, for example, as the alkali metal or alkaline earth metal hydroxide or carbonate, to remove free hydrochloric acid, dried, and fractionated to separate the methyl methacrylate from any unchanged chloroisobutyric ester that may have distilled over in the initial fractionation.

In the present invention zinc appears to act catalytically, causing the removal of a mol of hydrogen halide per mol of ester, rather than, as would be expected, entering into the reaction with the formation of zinc chloride. The reaction follows the equation:

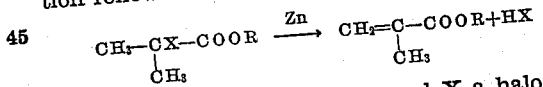

in which R is an alkyl group and X a halogen. This is a surprising result since the reaction would have been expected to take place as indicated in the equation below:

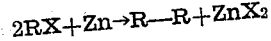

in which R is an alkyl group and X a halogen.

The invention will be further illustrated by the following examples which will not in any way limit the scope of the invention to specific proportions or reactants therein given:

Example I

A mixture of 500 grams of methyl alpha-chloroisobutyrate and 26.6 grams of zinc powder was heated under a distilling column with a reflux adjusted so that the distillate consisted largely of methyl methacrylate along with hydrogen chloride. The zinc may be added portionwise as the reaction proceeds. The crude distillate was washed with aqueous sodium carbonate (to remove acid), dried, and distilled (with the addition of 2.5 grams of hydroquinone to prevent polymerization). A 220 cc. portion of methyl methacrylate was obtained boiling at 98–101° C. The higher boiling portion of the distillate is largely unreacted methyl alpha-chloroisobutyrate.

The above example indicates that the reaction is catalytic in nature rather than a double decomposition reaction, since 0.42 atom of zinc has led to the production of more than 2 mols of methyl methacrylate. Smaller proportions of zinc will suffice in this reaction and when much larger proportions of zinc are used, as in the following examples, the reaction proceeds in a similar manner with most of the zinc recoverable in an unaltered condition at the end of the reaction.

Example II

A mixture of 100 grams of granular zinc and 160 grams of ethyl alpha-chloroisobutyrate was heated under a distilling column with the reflux adjusted so that the distillation temperature never exceeded 128° C. Most of the zinc was unaltered at the end of the reaction. The distillate was washed with sodium carbonate, dried over calcium chloride, and fractionated, yielding 82 grams of ethyl methacrylate.

Example III

A mixture of 450 grams of butyl alpha-chloroisobutyrate, 250 grams of zinc dust, and 1 gram of hydroquinone was heated until the initial vigorous reaction subsided and the liquid was removed from the reaction vessel by distillation under reduced pressure. The distillate was washed with sodium carbonate, dried, and fractionated at atmospheric pressure. Butyl methacrylate obtained amounted to 250 grams.

In Examples II and III, a small amount of hydroquinone was used as a polymerization inhibitor for the methacrylic ester.

My process may be employed for the treatment of organic compounds having the structural formula

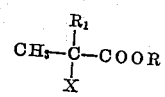

in which formula $R_1$ is a hydrocarbon radical such as methyl, ethyl, propyl, butyl, phenyl, tolyl, etc., X is a halogen atom such as chlorine, bromine and iodine and R is an alkyl group such, for example, as methyl, ethyl, propyl, butyl, or the higher alkyls such as octyl, hexyl, etc. Examples of this type of compound are esters of alpha-methyl alpha-chloropropionic acid, alpha-ethyl alpha-chloropropionic acid, alpha-phenyl alpha-chloropropionic acid, etc. When the alpha substituent is greater than a methyl group and contains H in the beta position esters of various isomeric unsaturated acids are obtained.

Zinc, which is employed as a catalyst in the above reactions, may be used in amounts ranging from 0.5 to 10% or more, although generally approximately 5% of zinc is sufficient to bring about the desired reaction since the metal does not appear to be used up during the reaction. The zinc halides and more particularly zinc chloride and zinc bromide may be used in lieu of zinc and will effect the dehydrohalogenation of methyl-alpha chloroisobutyrate in good yields but they appear to act more slowly than metallic zinc.

The reaction may be carried out if desired in the presence, as well as in the absence, of organic diluents. Stirring may or may not be applied. A suitable method of carrying out the reaction consists in dropping the ester of alpha-chloro-isobutyric acid continuously into a stirred hot suspension of zinc in an inert diluent such as xylene and allowing the methacrylate to distill from the reaction mixture as formed. Reaction may likewise be conducted in the vapor phase by passing the alpha-chloroisobutyric acid ester vapor through a heated tube lined or packed with zinc. Ordinarily, the reaction is carried out at a temperature ranging between 90–180° C. Reduced or superatmospheric pressures may be employed to maintain these temperatures.

In consideration of the above specification, many changes may be made in the details thereof in given without departing from the invention or sacrificing any of the advantages that may be derived therefrom.

I claim:

1. A process for the preparation of esters of alpha beta-unsaturated acids which comprises dehydrohalogenating, at a temperature sufficient to effect dehydrohalogenation, an alpha-hydrocarbon substituted alpha-halogenated propionic ester in the presence of a substance selected from the group consisting of zinc and zinc halides as the catalyst, substantially in accord with the equation:

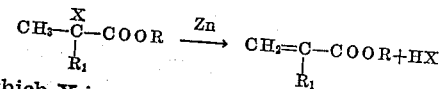

in which X is a halogen atom, R an alkyl radical and $R_1$ a hydrocarbon radical.

2. The process of claim 1 in which the halogenated ester is an alpha-alkyl substituted alpha-chlorinated propionic acid ester.

3. The process of claim 1 in which the halogenated ester treated is an alpha-aryl substituted alpha-chlorinated propionic acid.

4. The process of claim 1 in which the halogenated ester treated is an ester of alpha-chloroisobutyric acid.

5. The process of claim 1 in which the halogenated ester treated is methyl alpha-chloroisobutyrate.

6. A process for the preparation of methyl methacrylate which comprises heating to refluxing temperature a mixture containing methyl alpha-chloroisobutyrate and metallic zinc.

7. A process for producing esters of methacrylic acid which comprises dehydrohalogenating an alpha-chloroisobutyric acid ester by contacting it with metallic zinc.

8. A process for producing esters of methacrylic acid which comprises dehydrohalogenating an alpha-chloroisobutyric acid ester in the presence of from 0.5 to 10% metallic zinc.

9. A process for the preparation of alkyl esters of alpha beta-unsaturated, alpha-hydrocarbon substituted acids from the corresponding ester of a halogenated lower fatty acid, the step which comprises dehydrohalogenating the ester of the halogenated fatty acid by contacting it with zinc chloride, at a temperature sufficient to effect dehydrohalogenation.

10. A process for the preparation of methyl methacrylate which comprises dehydrohalogenating methyl alpha-chloroisobutyrate in the presence of zinc powder by heating to a temperature between 90 and 180° C., distilling off the methyl methacrylate together with the hydrogen chloride, washing and neutralizing the crude distillate and subsequently drying and purifying by distillation the neutralized product, in the presence of a polymerization inhibitor.

HAROLD J. BARRETT.